United States Patent [19]

Ban et al.

[11] Patent Number: 4,819,590

[45] Date of Patent: Apr. 11, 1989

[54] CONTROL VALVE DRIVING DEVICE IN AN INTERNAL COMBUSTION ENGINE

[75] Inventors: Masaki Ban, Tokyo; Kazuman Taniuchi; Hiroyuki Morita, both of Asaka, all of Japan

[73] Assignee: Honda Research and Development Co., Ltd., Tokyo, Japan

[21] Appl. No.: 85,079

[22] Filed: Aug. 13, 1987

[30] Foreign Application Priority Data

Aug. 13, 1986 [JP] Japan ................. 61-189937

[51] Int. Cl.[4] ................. F02B 75/02; F02D 39/04
[52] U.S. Cl. ................. 123/65 P; 123/323
[58] Field of Search ................. 123/65 PE, 65 V, 323, 123/65 P, 52 M

[56] References Cited

U.S. PATENT DOCUMENTS

| 4,430,975 | 2/1984 | Ishida et al. | 123/399 |
| 4,549,518 | 10/1985 | Koumura | 123/478 |
| 4,557,233 | 12/1985 | Joppig et al. | 123/323 |

Primary Examiner—David A. Okonsky
Attorney, Agent, or Firm—Lahive & Cockfield

[57] ABSTRACT

A control valve driving device wherein a control valve is provided in an intake or an exhaust system of an internal combustion engine and means for driving this control valve in response to an operating condition of said internal combustion engine is provided. An opening angle of the control valve is operable to be changed to permit an intake or an exhaust characteristic to be changed. The control valve driving device is characterized in that the control valve can be driven only when a pressure in an intake or an exhaust pipe is at an acceptably low level.

6 Claims, 4 Drawing Sheets

CONTROL VALVE DRIVING DEVICE IN AN INTERNAL COMBUSTION ENGINE

GENERAL BACKGROUND

The present invention relates to a control valve driving device, and more particularly to a control valve driving device which is intended to change an opening angle (i.e. effective size) of a control valve provided in an intake or an exhaust system thereby permitting an intake or an exhaust characteristic of an engine to change.

In an internal combustion engine, for example, a piston valve type of two cycle gasoline engine, control of exhaust gas flow to an intake of an exhaust passage is made by a port of the cylinder cooperating with a piston reciprocating in this cylinder. In this two cycle engine, in order to enhance a filling efficiency of the mixing gas in the cylinder, the mixing gas is confined at high density at the intake side, while it is necessary that pushing back action is effected so as to not cause ventilation of refresh air from the cylinder at the exhaust side.

For this purpose, for example, as shown in Japanese Utility Model Application publication No. 55-132321 (132321/1980), in the two cycle engine, an exhaust pipe is formed in a chamber narrowed down at its leading end to utilize a reflecting wave of an exhaust pressure. In this case, the reflecting wave is set to reach this portion in a timing immediately before an exhaust port is closed. However, it is impossible to obtain a good pushing back action without changing from a low speed revolution region to a high speed revolution region. For this reason, in the prior art, there have been adopted various methods which adjusts a phase of a reflecting wave of intake and exhaust system by controlling pulse of an exhaust pressure.

That is, as shown in FIGS. 1 and 2, in a wall portion of a cylinder 1 there is formed an exhaust port 3 which is opened and closed by a piston 2. Near the exhaust port 3 is provided a control valve 4. Valve 4, for example, may have a half-drum shape adapted to open and close an upper portion of the exhaust port 3. Thus, the control valve 4 is driven or rotated to an open direction to hasten an exhaust timing when the revolution number of the engine has increased, in order to obtain a good driving efficiency.

In such a prior system, as shown in PCT/JP application No. 86/00671, good driving efficiency has been obtained by utilizing a pulsation of an exhaust pressure and control means which to give an optimum opening angle of the control valve 4 based on revolution number of engine or the like. However, a fact that the pulsation of the exhaust pressure is utilized means that the pressure of the pulsation is satisfying the required value.

Accordingly, when a peak pressure is generated by the pulsation, the same pressure is exerted on the control valve 4, whereby the pressing or sucking force is adapted to act on the control valve 4 in proportion to a pressure receiving area of the control valve 4. Since this force becomes such as to resist a movement of the control valve 4, a driving device driving the control valve 4 necessitates having a driving mechanism which can overcome such a resisting force.

SUMMARY OF THE INVENTION

In the light of the above mentioned points, it is an object of the present invention to provide a control valve driving device in an internal combustion engine which is operable to sustain substantially no loss of a driving force caused by resisting force which is formed by a pulsating pressure. This makes it possible to design a control valve device which is small in its size and which is light in its weight and does not require excessive power to overcome pressure pulse generated, valve movement resisting force.

The control valve driving device in the internal combustion engine according to the present invention is intended to detect a pressure near a control valve provided in an intake or an exhaust passage of an engine and to drive the passage control valve only when the pressure is below a required low value, i.e. fully low. This control valve driving device comprises a control valve provided in an intake or an exhaust system of an internal combustion engine and means for driving this control valve in response to an operating condition of this internal combustion engine.

The opening angle (i.e. effective opening size) of this control valve is changeable in order to permit an intake or an exhaust characteristic to be changed. This device is characterized in that this device includes:

a pressure sensor for detecting a pressure near this control valve; and means for detecting that the detected pressure is larger than a required value and generating an output signal in response to the detecting.

The driving means thus described is adapted to drive the control valve only in the absence of said output signal, i.e. when excessive valve movement impending gas pressure is acting on the valve.

In describing this invention reference will be made by way of example, but not limitation to presently preferred embodiments hereinafter described with reference to appended drawings.

DRAWINGS OF PREFERRED EMBODIMENT

Figure 5:
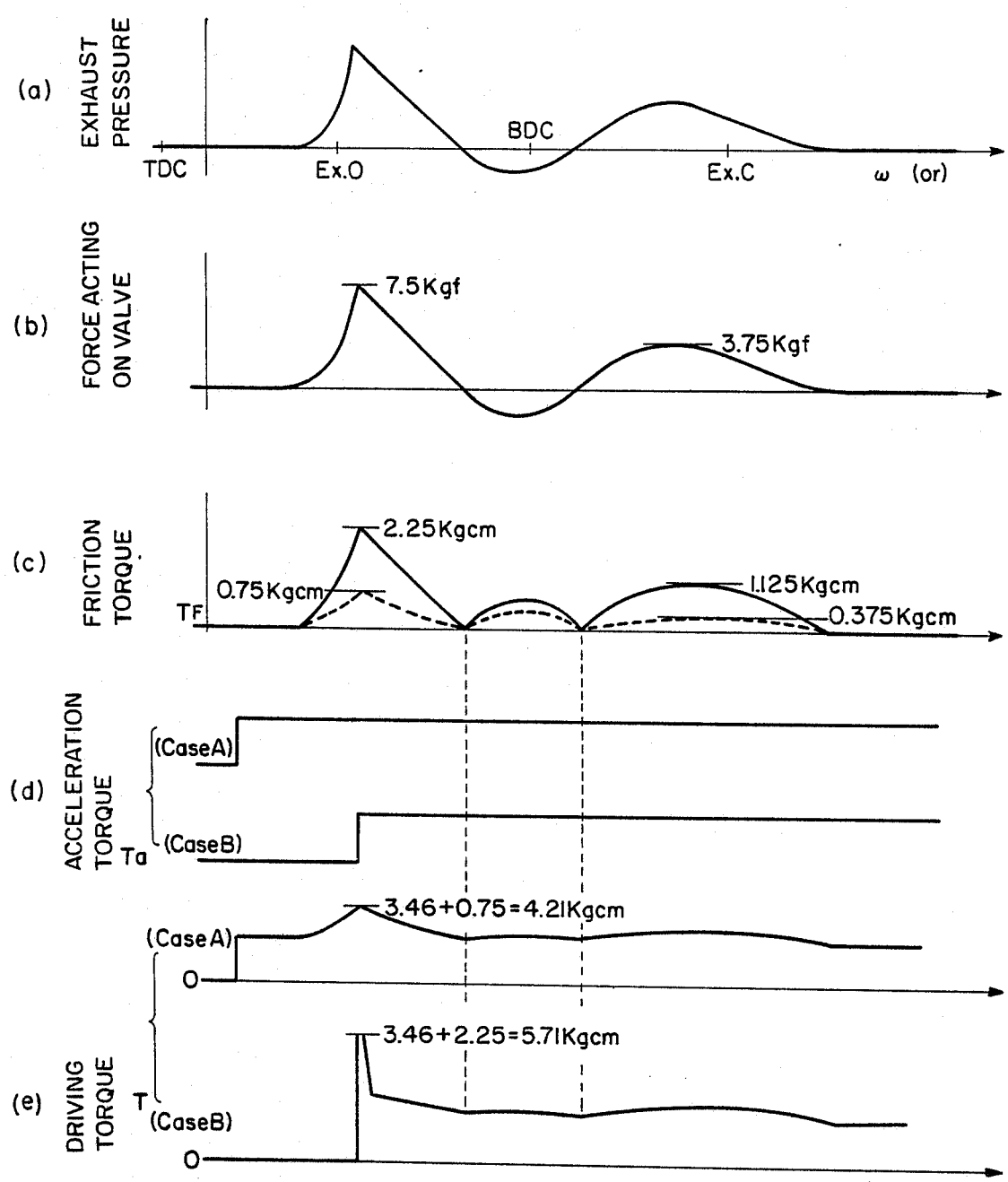
Figure 6:
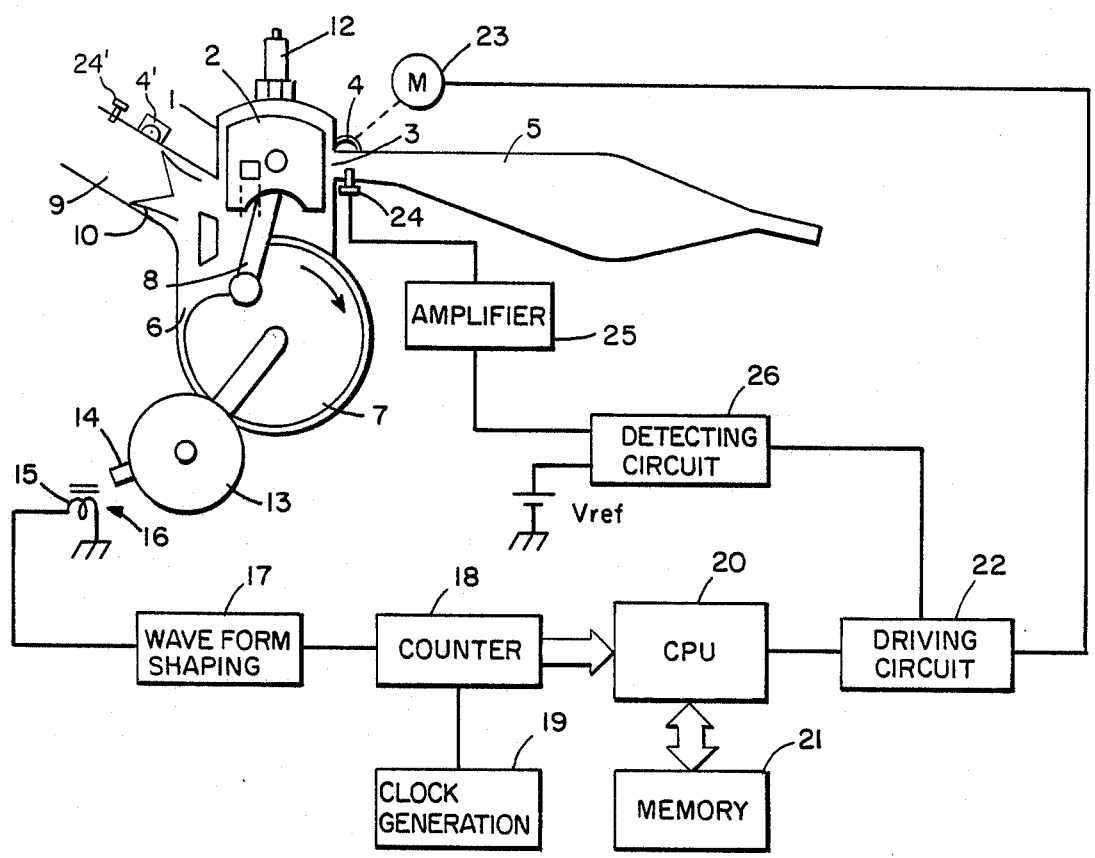

FIG. 5 is a waveform view showing a correlation of an exhaust pressure (a), a force (b) which acts on the control valve 4, a torque TF (c) which depends on the friction of bearing portion of the control valve 4, the torque Ta (d) which is necessary to accelerate the valve, and a torque T(e) which is necessary to drive the valve; and FIG. 6 is a block diagram showing one embodiment of the present invention.

DETAILED DESCRIPTION OF PREFERRED EMBODIMENT

A presently preferred embodiment of the invention will now be described in detail with reference to the attached drawings.

Figure 1:
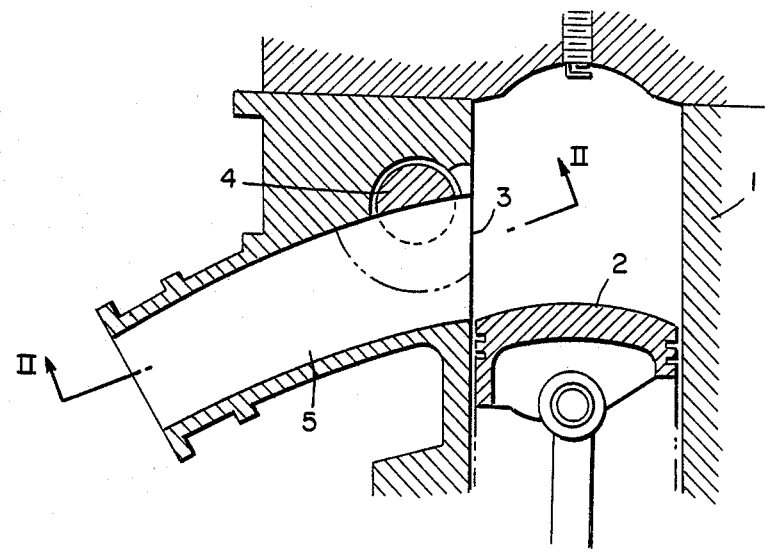
FIG. 1 is a cross-sectional view showing the vicinity of an exhaust port of a two cycle engine.
Figure 2:
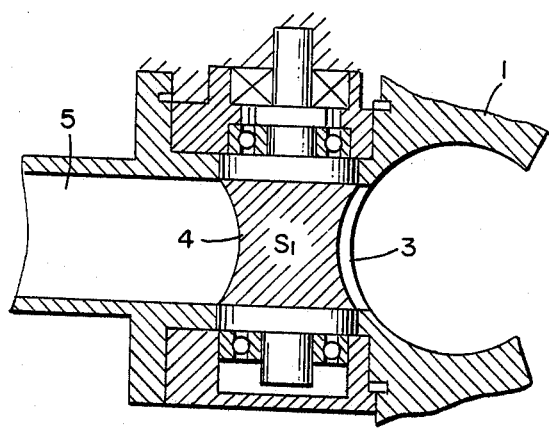
FIG. 2 is a cross-sectional view taken along II—II in FIG. 1.
Figure 3:
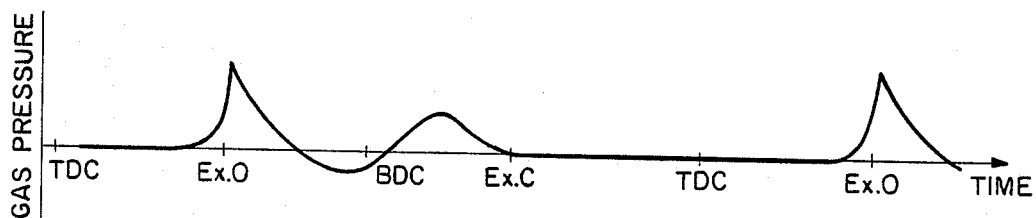
FIG. 3 shows the effects of changes in exhaust pulsating pressure.

First, it will be recognized that, as shown in FIGS. 1 and 2, a pulsation of an exhaust pressure in an exhaust pipe 5, for example, near an exhaust port 3, becomes high on opening (Ex. of FIG. 3) of the exhaust port 3 when combustion gas in a cylinder 1 is blown down at once, as shown in FIG. 3. Thereafter this exhaust gas pressure pulsation depicts a period waveform such that a positive pressure of a reflecting wave in an exhaust chamber returns on closing (Ex. of FIG. 3) of the exhaust port 3. At this time, a wave height value of the blow down reaches about 1.5–2 Kgf/cm 2 and a wave height value of the reflecting wave in the chamber also reaches about 1 Kgf/cm 2. Further, in FIG. 3, BDC shows pressure at a below dead center point of a piston and TDC shows pressure a top dead center point of the piston.

Now, in FIG. 2, supposing that an area S1 of a receiving or exposed portion (hatched portions) of the control valve 4, has a value for example, of 3.75 cm 2, the force F that the control value 4 receives from an exhaust pulsating pressure Po is found by the following equation:

$$F = Po \times S$$

The force Fa developed on blowing down becomes 7.5 Kgf at maximum (2 Kgf//cm 2) and 3.75 Kgf on peak of the reflecting wave.

In taking account of the exposure of the control valve 4 to exhaust gas pressure and observing that a static friction coefficient u.s. exists between the control valve 4 and its periphery as well as bearings is 0.3, and that a dynamic friction coefficient for $\mu d$ for these elements is 0.1, a friction torque T which is generated by the exhaust pulsating wave actiing on the control valve 4 is found by the following equation, (if an average radius "r" of the friction portion is, for example, 10 mm):

$$T = \mu Fr \, ps$$

From this equation, the following values can be obtained;
On starting,
2.25 Kgfcm, when Fa = 7.5 Kgf
1.125 Kgcm, when Fb + 3.75 Kgf
During driving,
0.75 Kgcm, when Fa = 7.5 Kgf
0.375 Kgcm, when Fb = 3.75 Kgf.

Next, supposing that a fly wheel effect of the control valve 4 is GD 2 = 0.00026 [Kgt m 2], that a full stroke is 30° which is accelerated by equal acceleration up to 15°, and that a required time is ta = 0.01 sec., the torque Ta which is necessary for acceleration is expressed by the following equation.

$$Ta = (GD \, 2/375) \, (n/ta) \, [Kgm]$$

Herein, n is a developed revolution number and it is given by the following equation.

$$n = (20/ta)(1/360)0.60 = 500 \, (rpm)$$

Figure 4:
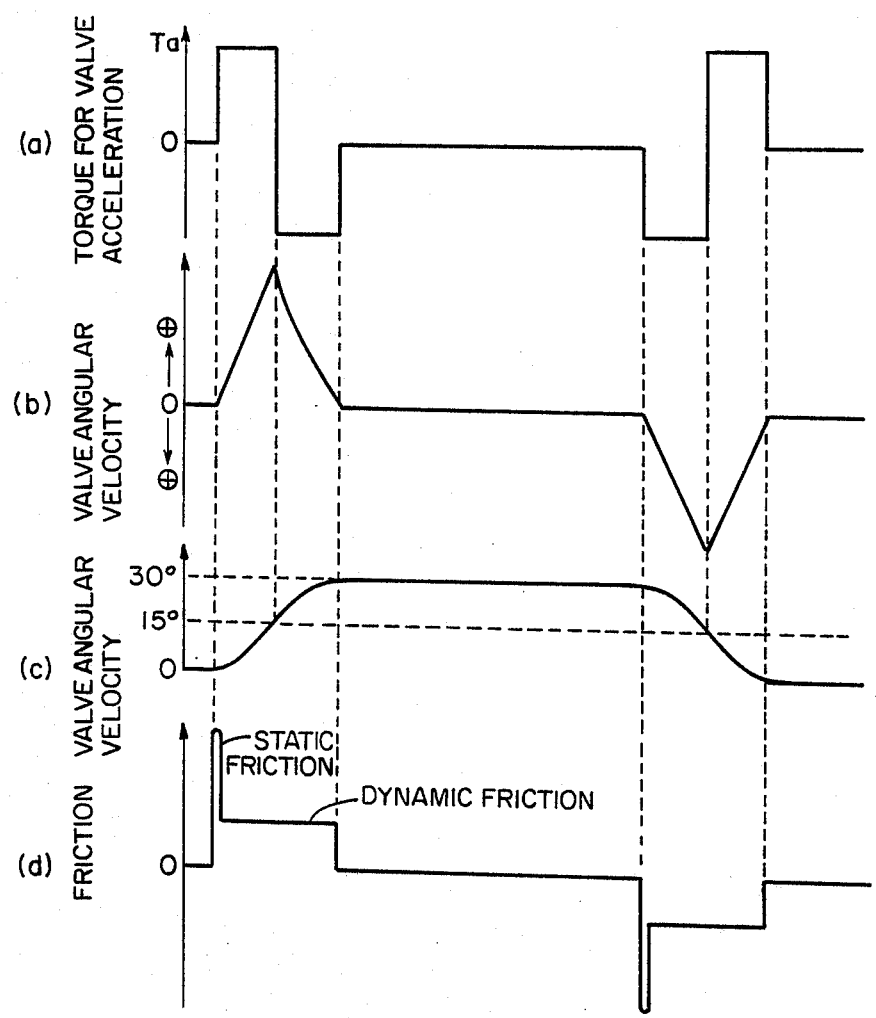
FIG. 4 is a waveform view showing a correlation of a torque Ta (a) which is necessary to accelerate a valve, an engine velocity (b) of valve, a valve angle (c), and a friction (d)

Accordingly, the torque Ta which is necessary for acceleration becomes Ta = 3.4 [Kgcm] from the above equation. Correlation of the torque Ta (a) which is necessary to accelerate the valve, an angular velocity of the valve (b), an angle (c) of the valve, and a friction (d) mentioned above is shown in the composite depiction of FIG. 4.

FIG. 5 shows a correlation of the exhaust pressure (a), the force (b) acting on the control valve 4, a torque T F (c) due to friction of bearing portion of the control valve 4, the torque Ta (d) which is necessary to accelerate the valve, and a torque T (e) which is necessary to drive the valve.

Friction is generated due to a weight of the valve when the exhaust pulsating pressure wave does not act on the control valve 4. However, if such friction may be disregarded, and friction considered only as generated when the exhaust pulsating pressure wave is acting on the control valve 4. Assuming then, in addition, that power transmitting loss is disregarded, the torque T which is necessary to drive the valve is T = T F + Ta.

Accordingly, as shown in FIG. 5, display (e), when a starting timing of the control valve 4 is changed, the torque is 4.21 Kgcm at its maximum value in a case A, which sets the starting timing when the exhaust pulsating pressure is substantially zero. In a case B, which sets the starting timing when the exhaust pulsating pressure is largely loaded, since the maximum exhaust pulsating pressure received by the control valve 4 is 7.5 Kgf, the torque becomes 5.71 Kgcm at its maximum valve. Thus, as will be seen, the required control valve driving torque T generates a wide difference according to the starting timing of the drive.

Therefore, in case that the starting timing of the driving (i.e. rotation) of the control valve 4 is not selected to avoid high torque, the latter must be driven by a motor which has a large torque capacity, capable of corresponding to the maximum value 5.71 Kgcm of the case B, or permit the control valve to be in an immovable or locked condition until the torque of the motor overcomes the friction caused by the gas pressure acting on the control valve 4, as the driving current is flowed into the motor. However, in the former, case, this necessitates a motor of large weight and a power supply of a large capacity being capable of driving the motor. In the latter case, since the current flowing into the motor when it is a direct current motor and the valve cannot move, amount of consumption of electric power becomes larger. Also, in case of using a pulse motor, since the latter case causes it to be impossible to effect adjusting, a feed back circuit becomes necessary thereby causing complicated and expensive control circuit.

Thus, through the present invention it is intended that the starting movement timing of the control valve 4 is controlled and that a timing for movement is selected when the pressing force of gas acting on the control valve 4 due to the exhaust pulsating pressure becomes acceptably low. In this manner the driving force required for the control valve 4 is adapted to be lowered.

The following description will now be made of one embodiment of the present invention with reference to FIG. 6.

In FIG. 6, the similar portions to FIGS. 1 and 2 are shown by the same reference numerals and therefore, the following description is made of members other than these.

Reference numeral 6 shows a crank case constituted integrally with a cylinder 1. Reference numerals show a crank 7 rotating in this crank case 6 and a connecting rod 8 which connects the crank 7 with the piston 2. Reference numerals also show an intake pipe 9 and a conventional reed type check valve provided in the intake pipe 9 at 10. Further, these reference numerals show a scavenging port 11 which connects the crank chamber with an upper portion of the cylinder and an ignition plug 12 provided on a cylinder head mounted on an upper portion of the cylinder 1. The exhaust pipe 5 is provided in the form of a chamber shape which is narrowed down at its leading end.

The control valve driving device of the present invention is applied to the two cycle engine having the elements mentioned above. To the crank 7 is directly connected a rotor 13 which rotates in driving train linked cooperation with the crank 7. A crank angle sensor 16 is constituted by a magnet 14 provided on a peripheral wall of the rotor 13 and a coil 5 arranged to oppose the magnet 14 and generate a pulse whenever the crank 7 rotates through a required angle. One pulse signal is thus generated from the crank angle sensor 16 for every single rotation of the crank 7 and is supplied to a counter 18 after waveform shaping in a waveform shaping circuit 17. The counter 18 comprises a clock input supplied from a clock generator 19 during the input of the pulse signal generated in the crank angle sensor 16 and is thus adapted to obtain data indicating the revolution number of the engine. The data of the revolution number of engine obtained is supplied to a CPU (central processing unit) 20.

The CPU 20 generates a driving command for a driving circuit 22 which controls the movement, i.e. the opening and closing of the control valve 4. The latter valve 4 is driven in the opening direction when the revolution number of engine is judged to be high on the basis of a set revolution number pre-stored in a memory 21 and in the closing direction (i.e. flow restricting) when it is judged to be low. In response to this driving command, the driving circuit 22 is operable to control and effect the opening and closing of the control valve via a motor 23.

Near the control valve 4 in the exhaust pipe 5 is a pressure sensor 24 which detects exhaust pressure at its vicinity. The pressure sensor 24 generates an output of a level related to and varying with the exhaust pressure detected. The detected output is supplied to a detecting circuit 26 via an amplifier 25. This detecting circuit 26 monitors the output level of the pressure sensor 24 and generates a detecting output signal when the output level becomes larger than the required, acceptably low reference level Vref. This detecting level is supplied to the driving circuit 22. The latter not operable to drive the motor 23 while the detecting output is being supplied from the detecting dircuit 26 even if the driving command of the control valve 4 is being generated from the CPU 20.

By means of this arrangement, the starting of the control valve 4 is intended to be performed only when the exhaust pressure near the control valve 4 is lower than the required value. As a result of this, since the control valve 4 can be started so as to avoid the period when the pressing force acting on the control valve 4 due to the exhaust pulsating pressure produces a high friction torque (resisting force), the driving force can be reduced by the amount required to overcome such a friction force and the starting of valve movement can be initiated with a small driving force.

Further, it is preferable that the reference level Vref in the detecting circuit 26 be set at a value which can detect a condition in which the exhaust pulsating pressure is substantially zero (i.e. substantially at its lowest ebb). This makes it possible to obtain the starting timing of the case A in FIG. 5($d$), and it is understood that this starting can be effected with the small driving torque, as apparent from FIG. 5 ($e$).

By reducing the required valve driving force, the motor 23 may be small in its capacity. Further, since the motor 23 is driven by the power supply (not shown), the fact that the motor is small in its capacity is related to the advantage that the power supply may be decreased in its capacity. Thus, as one example, the following description is made of the cases A and B in FIG. 5($d$). In the case A (output 4.2 Kgcm), it is pointed out that the motor current is 3.35 at 12V, that the weight of the motor is 130 g, that the battery capacity is 350 mAH and that the weight of the battery is 175 g. In the case B (output 5.7 Kgcm), it is pointed out that the motor current is higher A at 12 V, that the weight of the motor is 150 g, that the battery capacity is 480 mAH, and that the weight of the battery is 240 g.

As is apparent from the above numerical sample, the motor itself is lightened by 20 g, but its weight including the battery is lightened by 85 g. Accordingly, the device is intended to lighten for 16.6% as a while.

Further, in the above mentioned embodiment, a description has been given about a case using the revolution number of engine as an engine parameter for driving the control valve 4. However, the present invention is not limited to such a case. For example, valve driving can be controlled by utilizing the output of the pressure sensor 24 and by directly detecting the exhaust pulsating pressure to effect the unique control concept characterizing this invention. By this, it is possible to provide an engine which presents a preferred output at all of the driving conditions which are changed by opening angle (i.e. effective opening size) of throttle, temperature of intake and exhaust system, pressure difference caused from sea level difference, variations of volume in the exhaust chamber due to deposit (carbon) in the exhaust pipe, deformation of the chamber, wear of engine, or the like. Such an embodied structure circuiting is shown in the specification of Japanese patent application No. 60-299291 (No. 299291/1985) filed by the applicant and could be used as input sensing for implimenting the controlled valve movement initiation of this invention.

Also, in the above embodiment, a description has been made of an exhaust system of a two cycle engine. However, the invention may also be applied to the intake system of two or four cycle engine, for example by using pressure sensor 24' and control valve 4' shown in FIG. 6. The above identified specification also discloses control valve driving in the intake system of the four cycle engine.

Further, the present invention may be applied to all systems in which the intake and/or exhaust pressure acts on a valve so as to impede movement even through the actuation of the control valve does not synchronize with the engine stroke. For example, it may be applied to a device which is provided with a sub-chamber in an exhaust system and which is constituted to alternatively communicate this sub-chamber with an exhaust passage by a control valve.

EFFECT AND SCOPE OF THE INVENTION

As mentioned above, the present invention is intended to detect the pressure near the control valve provided in the exhaust system and to drive the control valve only when the pressure is below a required, i.e. acceptably low, value. Accordingly, since initiation of movement of the control valve is adapted to be effected so as to avoid the period when the gas pressing force acting on the control valve due to the pulsating pressure becomes a significant resisting force, the required driving force can be reduced effectively and therefore the driving of the control valve can be decreased to the small force requirement. As a result of this, it makes it possible to decrease the capacity of the motor for driving the control valve and therefore, the capacity of the power supply, and thus decrease the whole device in size and weight.

Those who become familiar with this disclosure and are skilled in the engine control art may well envision additions, deletions, substitutions, equivalents, or other modifications deemed to fall within the scope of the invention as set forth in the appended claims.

What is claimed is:

1. A control valve driving device comprising
   a control valve provided in at least one gas transfer passage of an internal combustion engine;
   the opening angle of said control valve being changeable to permit one of an intake or an exhaust characteristic to be changed,
   said device being characterized in that said device includes:
   a pressure sensor for detecting a pressure near said control valve;
   means for calculating a target value for driving said control valve in response to an operating condition of said internal combustion engine,
   means for driving said control valve in response to said target value,
   said driving means being actuatable at any stage of combustion, at any time that said detected pressure is lower than a predetermined value.

2. A control valve driving device as claimed in claim 1, wherein
   said control valve comprises a control valve for a two cycle engine,
   said control valve being operable to be actuated to reach an opening position in response to an engine parameter.

3. A control valve driving device comprising
   a control valve provided in an exhaust passage system of an internal combustion engine and means for driving said control valve in response to an operating condition of said internal combustion engine.
   an opening angle of said control valve being operable to be changed to permit an exhaust characteristic to be changed,
   said control valve driving device being characterized in that said control valve can be driven only when a pressure in said exhaust passage is substantially at its lowermost value.

4. A control valve driving device as claimed in claim 3, wherein
   said control valve comprises a control valve for a two cycle engine,
   said control valve being operable to be actuated to reach an opening position in response to an engine parameter.

5. A control valve driving device comprising
   a control valve provided in an intake passage system of an internal combustion engine and means for driving said control valve in response to an operating condition of said internal combustion engine.
   an opening angle of said control valve being operable to be changed to permit an intake characteristic to be changed.
   said control valve driving device being characterized in that said control valve can be driven only when a pressure in said intake passage is substantially at its lowermost value.

6. A control valve driving device as claimed in claim 5, wherein
   said control valve comprises a control valve for a two cycle engine,
   said control valve being operable to be actuated to reach an opening position in response to an engine parameter.

* * * * *